US006558496B1

(12) United States Patent
Brooke et al.

(10) Patent No.: US 6,558,496 B1
(45) Date of Patent: *May 6, 2003

(54) RAPID TEXTURE PROTOTYPING

(75) Inventors: Nigel Brooke, Oldham; Michael Stuart Miller, Buxton, both of (GB)

(73) Assignee: Eschmann-Stahl GmbH & Co., KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,459

(22) Filed: Jan. 11, 2000

Related U.S. Application Data

(63) Continuation-in-part of application No. 09/237,591, filed on Jan. 19, 1999.

(30) Foreign Application Priority Data

Nov. 28, 1997 (GB) ............................................. 9725102
Jan. 9, 1998 (WO) ................................ PCT/GB98/00065
Mar. 31, 1999 (GB) ............................................. 9907273

(51) Int. Cl.[7] ......................... B29C 33/40; B29C 35/08; B29C 41/02; B44C 1/165
(52) U.S. Cl. ...................... 156/230; 156/236; 156/238; 156/264; 156/272.8; 264/153; 264/225; 264/226; 264/227; 264/302; 264/401; 264/497
(58) Field of Search .................. 264/153, 225, 264/226, 227, 302, 401, 497; 156/230, 236, 238, 264, 272.8; 427/146, 147, 149

(56) References Cited

U.S. PATENT DOCUMENTS

| | | | |
|---|---|---|---|
| 2,556,504 A | 6/1951 | Prestwich | |
| 2,984,596 A | 5/1961 | Franer | |
| 3,434,861 A | 3/1969 | Luc | |
| 3,607,526 A | 9/1971 | Biegen | |
| 3,723,584 A | 3/1973 | Nussbaum | |
| 3,791,905 A | 2/1974 | Molner | |
| 3,936,554 A | 2/1976 | Squier | |
| 4,308,310 A | 12/1981 | Arnold et al. | |
| 4,490,410 A | 12/1984 | Takiyama et al. | |
| 4,983,487 A | 1/1991 | Gilreath | |
| 5,047,103 A | 9/1991 | Abrams et al. | |
| 5,171,392 A | 12/1992 | Iida et al. | |
| 5,182,063 A | 1/1993 | Stefan et al. | |
| 5,427,890 A | 6/1995 | Suzuki et al. | |
| 5,435,959 A | * 7/1995 | Williamson et al. | 264/221 |
| 5,483,890 A | 1/1996 | Kildune | |
| 5,492,663 A | 2/1996 | Greenwald et al. | |
| 5,504,144 A | 4/1996 | Dorpfeld et al. | |
| 5,527,407 A | 6/1996 | Gartland et al. | |
| 5,639,536 A | 6/1997 | Yamazaiki et al. | |
| 6,251,208 B1 | 6/2001 | Serizawa et al. | |

FOREIGN PATENT DOCUMENTS

| | | |
|---|---|---|
| EP | 0 400 672 A2 | 12/1990 |
| EP | 0 668 136 A1 | 8/1995 |
| FR | 2 631 861 A1 | 12/1989 |
| GB | 2 246 536 A | 2/1992 |
| GB | 2259883 A | 3/1993 |
| WO | WO91/08096 | 6/1991 |
| WO | WO 98 15372 A1 | 4/1998 |
| WO | WO 99 03662 A1 | 1/1999 |
| WO | WO 99 28113 A1 | 6/1999 |

OTHER PUBLICATIONS

Grobholz, H.; "Nase Vorn," Technishe Rundschau, CH Hallwag Verlag. Bern, vol. 87, No. 41; Oct. 13, 1995; pp. 46–47.

* cited by examiner

*Primary Examiner*—Leo B. Tentoni
(74) *Attorney, Agent, or Firm*—Wallenstein & Wagner, Ltd.

(57) ABSTRACT

There is disclosed a method for simulating the appearance of an article having surface texture comprising the step of applying a textured skin having a surface texture to a prototype to produce a textured prototype, thereby to simulate the appearance of the article having surface texture.

94 Claims, 3 Drawing Sheets

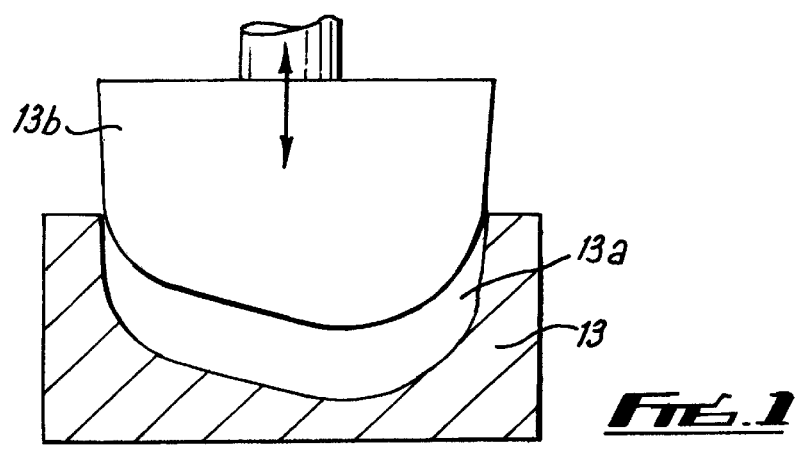
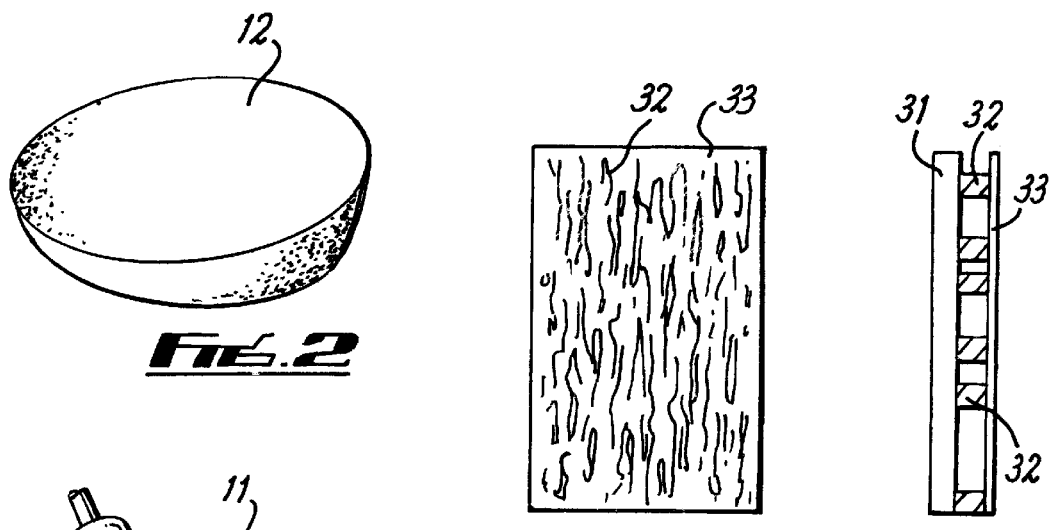
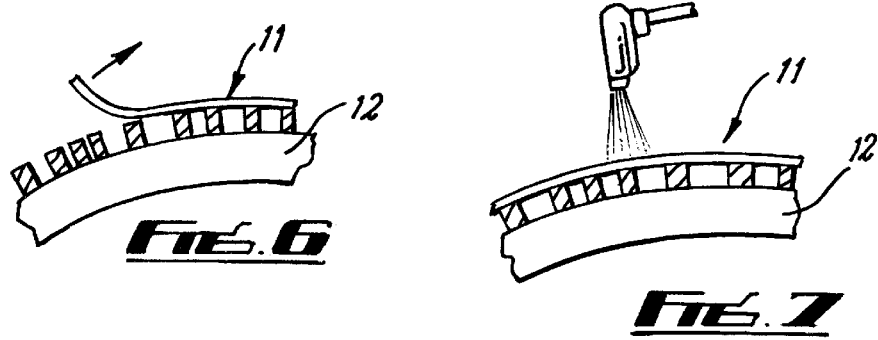

RAPID TEXTURE PROTOTYPING

This application is a Continuation-in-part application of co-pending application Ser. No. 09/237,591, filed on Jan. 19, 1999, which claims the benefit of British Application No. 9725102.9, filed Nov. 28, 1997.

FIELD OF THE INVENTION

This invention relates to rapid texture prototyping, i.e., to the production of textured prototype which can simulate the appearance and feel of an article. The invention also embraces the production of copies of the textured prototype.

BACKGROUND OF THE INVENTION

Many moulded articles are made with a textured surface finish. Examples include interior trim parts for automobiles, knobs and handles for cooking utensils, garden furniture, casings for audio and video equipment, computers and calculators, and so on. Many of these items are made from large, expensive moulds. The moulds are first made with a smooth moulding cavity which must then be etched to produce the texture. Etching is done by applying a resist and immersing the mould in acid etchant.

Once etched, it will usually be impossible, or at best highly impracticable, to expunge the texture and apply a different texture. It is vital, therefore, for a designer to have some idea of how the product will look, textured. To this end, computer simulations are proposed in which the item can be imaged to a screen using CAD techniques and a texture superimposed. No matter to what state of excellence this type of simulation can be raised, however, it still cannot give the designer a textured, truly three dimensional component to build into a prototype assembly of, say, an automobile.

Furthermore, it is desirable that a number of copies of a prototype can be made, using the original rapid prototype as a formative model.

Various methods are known by which rapid prototypes can be produced using computer aided design (CAD) software to generate three dimensional (3D) prototype designs. In stereolithography, a tank containing a resinous, UV sensitive polymer is selectively cured by UV radiation from, for example, a laser. The laser follows the CAD data profile to selectively cure the resin, building up layers of solid substrate. This procedure is accomplished by cross sectional "slicing" of the 3D CAD data to produce laminae of, for example, 0.1 mm thickness. The resin containing tank has a table positionable below the surface of the resin by an amount equal to the thickness of the lamina. The laser beam is tracked across this layer of resin to produce a thin layer of cured resin which is equivalent to the cross sectional CAD lamina. The table is then covered by an amount equal to the thickness of the lamina, and again the resultant layer of resin is cured by the laser beam so as to produce the physical equivalent of the next lamina in the CAD file. The process is repeated until the desired solid object us produced. Supporting structures can be added via the software: these structures are a part of the composite data file and are "grown" with the model required. On completion, the model is further treated, any supporting structures are removed, and the object is finished, to a produce smooth surface, by hand. It is highly advantageous that the object can be produced directly from a CAD design in a matter of days.

Other methods for rapid prototyping are Laminated Objective Manufacture (LOM) and Selective Laser Sintering (SLS). LOM involves computer driven cutting and lamination of thin paper sheets which are assembled as layers to produce a 3model. SLS involves the direct sintering of polymeric particles or of a metal composite in a layered fashion to produce 3D objects.

Prototypes can also be made by direct casting of glass fibre (GRP) models. The models are themselves cast from a moulding of the original clay prototype produced by a designer/stylist. GRP castings or other resinous castings can be taken from such (untextured) production mould tools, as well as from directly machined resin blocks. In the latter instance, CAD data can be used to drive a computer controlled (CNC) milling machine which automatically follows the contours of the CAD model, cutting away the resin (or other machinable material such as hard wood) to build up a 3D model of the prototype, often referred to as a mandrel. The moulding tools, typically in flexible silicone or hard epoxy, are cast from the mandrels. The moulding tools can then be used to produce multiple copies of the (untextured) mandrel.

None of these methods is able to properly impart a textured surface finish on to the prototype.

The present invention provides for rapid phototyping for textured-surface articles, including non-moulded articles, giving authentic pre-appreciation of both appearance and feel.

Furthermore, the present invention provides methods by which copies of such textured rapid prototypes can be made.

SUMMARY OF THE INVENTION

The invention comprises a method for simulating the apperence of an article having surface texture comprising the step of applying a textured skin having a surface texture to a prototype to produce a textured prototype, thereby to simulate the appearance of the article having surface texture.

The invention further comprises a method for producing copies of a textured prototype comprising the steps of:

applying a textured skin having a surface texture to a prototype to produce a textured prototype;

producing a mould of the textured prototype;

and using the mould to produce said copies.

The skin may comprise a skin layer with relief material attached thereto as a surface texture. The skin layer may constitute a release backing peeled off the prototype after application of the relief material thereto. The relief material may be preferentially adhered to the prototype to enable peel off of the release backing.

However, the skin layer may be soluble and be dissolved after the relief material is adhered to the prototype. The skin layer may be soluble in a paint which is applied after application to the prototype—the skin layer then becomes absorbed into the paint layer.

The skin may be burnished on to the prototype—this may be done before and/or after removal of the skin layer; if done before, burnishing serves the purpose of improving adhesion to the prototype and helping to smooth out any imperfections in application. Burnishing may be effected by a densely-bristled brush, though other burnishing tools may be found more appropriate to specific patterns.

As to patterns, the surface texture may be a random pattern texture, such as the popular leather and woodgrain finishes. A textured skin suitable for such finishes is commercially available glass engraving resist, in which a resist pattern is carried on a release sheet for application to a glass surface which is then sand blasted, the glass surface being eroded except beneath the resist which is then removed. In the present application, the resist material becomes part of the textured surface of the pre-textured prototype.

The method of the invention is particularly advantageous, however, with geometric patterns used as texture. Such patterns can be readily created by a CAD arrangement or like system which can control a cutting arrangement to cut the pattern into sheet material e.g. vinyl plastics sheeting. Such sheeting may be presented (in different thickness) on a release backing from which cut sheet may be separated, by differential bonding, on to a separate release sheet—there being then 'positive' and 'negative' versions of the pattern. Either release sheet then forms the skin layer of the textured skin.

Whilst the overall effect of a random—leather, woodgrain etc-pattern may be visualizable by skilled designers, the way a regular geometric pattern texture sits on a curved surface is less easy to imagine. Indeed, difficulties are experienced in engraving even moderately complicated moulds with geometric pattern textures as a resist-carrying backing sheet usually has to be creased to fit the mould. Often, a regular geometric texture simply cannot be applied because of the difficulties of engraving the mould, this explaining a preponderance of random textures, principally leathers.

However, for prototyping purposes as disclosed herein, the skin may be arranged to be stretchable to fit without creasing on to the prototype and the texture is imparted to the skin (as by a CAD arrangement) in distorted fashion to compensate for skin stretching to fit the prototype.

The prototype itself may or may not be moulded. A non-moulded prototype may be produced by stereolithography, laminated object manufacture or selective laser sintering.

The step of producing a mould of the textured prototype may comprise casting the textured prototype in a mould forming material, which may be silicone rubber.

The step of producing a mould of the textured prototype may comprise a slush moulding process in which a metal coating is electroformed onto the textured prototype or a replica thereof. The metal may be nickel.

The step of producing a mould of the textured prototype may comprise a moulding process in which metal is sprayed onto the textured prototype or a replica thereof to form a metal shell.

BRIEF DESCRIPTION OF THE DRAWINGS

FIG. 1 is a diagrammatic cross-section through a mould;

FIG. 2 is a view of a prototype made using the mould of FIG. 1;

FIG. 3 is a face-on-view of a textured skin layer to be applied to the prototype of FIG. 2;

FIG. 4 is a cross-section through the textured skin applying layer of FIG. 3, much enlarged;

FIG. 5 is a cross-section through part of the surface of the prototype of FIG. 2, with the skin from FIGS. 3 and 4 in place, and showing burnishing;

FIG. 6 is a cross-section like FIG. 5, showing peeling off a skin layer;

FIG. 7 is a cross-section like FIG. 5, showing painting over a soluble skin layer;

DETAILED DESCRIPTION OF THE INVENTION

Figure 8:
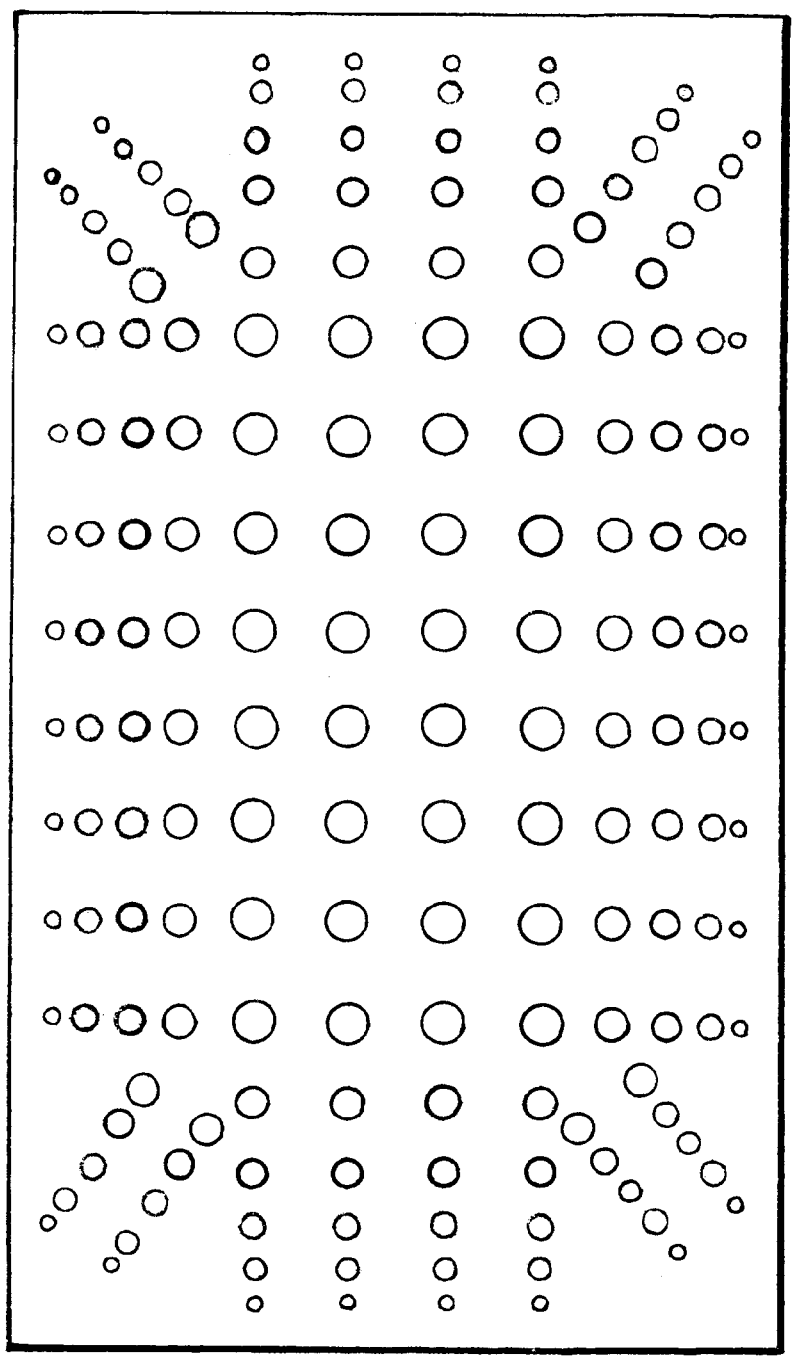
FIG. 8 is a face-on-view of a textured skin applying layer of a geometric texture pattern.
Figure 9:
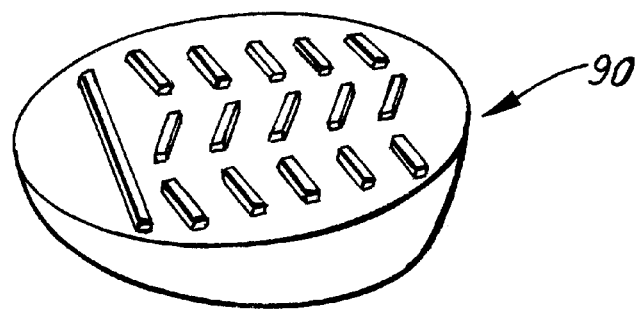
FIG. 9 shows a textured prototype.

FIGS. 1–10 illustrate methods for simulating the appearance of an article having surface texture, and for producing copies of a textured prototype.

The prototype 12 can be moulded using a mould 13, as shown in FIG. 1. The mould 13 comprises a mould cavity 13a and a cooperating former 13b. When first made the mould cavity is smooth-walled. For aesthetic reasons—as well as to conceal surface imperfections—or to provide grip (e.g. knurling on knobs, ribs on canister caps and so forth) it is usually intended that the visible surface (in the finished or assembled product of which the moulding is a component) is provided with a texture, which might be a random texture such as that of leather or woodgrain, or a regular geometric texture such as raised (or indented) cylindrical, square, diamond or other shaped areas arranged in a pattern. An example of a moulded prototype is a fibre glass moulding taken from prototype models which have been constructed in-house or by a model making service or from mandrels. Copies of textured prototypes can be produced by direct casting of a textured mandrel in a suitable material, such as silicone or epoxy resins, to produce "textured" mould tools from which multiple copies of the textured prototype can be made. The mould tools can be hard or soft, depending on the material selected. Alternatively, mould tools can be produced by casting an untextured, original, "master" model. These mould tools are used to produce moulded prototypes which are then textured, and copies of these textured prototypes are made using the above described methods. In this way, identical moulded prototypes can be differently textured in order to assess the effect of different textures on a prototype moulding.

Alternatively, it is possible that the prototype is not moulded. Techniques such as stereolithography, LOM and SLS might be used to produce the prototype.

The texture is applied to the mould surface by acid etching using a resist. This is a procedure that does not usually allow of second thoughts, and there is a strong desire on the part of the designers to be able to visualize the finished product before the final step necessary to produce that product— namely the application of a textured finish to the mould wall—has been finally and irrevocably carried out.

To this end, according to the invention, a preferred texture or a selection of preferred textures is made from a library or designed from scratch using, for example, a CAD system. A moulding 12 is made from the pre-textured mould 13, or as many mouldings as there are textures to assess.

FIGS. 3 and 4 illustrate a commercially available product that is suitable for use in the method. This product is known as glass engraving resist and is used in engraving glass by sandblasting. It comprises a protective backing 31 covering a pattern 32 on a film 33. The pattern 32 is realisably adhered to the backing 31. With the backing stripped off the pattern 32 is applied to a glass surface, in its regular use, having been first sprayed with an adhesive if necessary, to adhere to the glass while the film 33 is peeled off. The pattern material 32 protects the underlying glass from erosion by the sand particles and is later washed off.

Using this product in the present invention, the backing 31 is removed and the pattern material 32 is applied to the surface of the prototype 12, if necessary spraying the prototype 12 or the pattern material with a suitable adhesive. The film 33 and pattern material may now be securely pressed on to the prototype 12 as by burnishing—a brush 51 with densely packed bristles is an effective burnishing tool.

Further, now, the film 33 is peeled off, as seen in FIG. 6, for which it must be less well adhered to the pattern material 32 than the latter is to the prototype 12, or, if the material of the film is soluble in a suitable paint, such a paint is now sprayed on to the film 33 (FIG. 7) which dissolves the film leaving the contours of the pattern material 32 covered with a uniform paint layer as a seemingly integral texture to the prototype 12.

It is desirable, in any event, to paint the surface now textured even if the film 33 is removed—it is a texture which is desired to be simulated, and uniformly coloured surface is appropriate.

The glass engraving resist being a commercial product for an entirely different purpose, it cannot be expected that a full range of textures appropriate to entirely different circumstances would be available, nor that such a product could be available in bespoke designs, especially considering that, as used in the method taught herein, it is not a consumable of production, merely an adjunct to design. However, a wide, indeed practically limitless variety of designs can be readily produced using a CAD system, especially for geometric texture patterns. Basically, a CAD-produced design is used to cut a design out of sheet material, such as vinyl plastic sheet which may be supplied in roll form in a range of thicknesses, a thickness being selected according to the depth of relief required in the finished textured surface. The vinyl is cut to the required pattern while on a release backing and can be separated by the application of another release, or simply by peeling off from the backing a matrix out of which "islands" have been cut, leaving "positive" and "negative" patterns. This technique is very useful for producing logos.

A problem with geometric patterns is that, in a mould which has curvature in two directions, it is impossible to fit a pattern without cutting darts in the resist, and the same will be true of the simulation according to the invention.

Using CAD techniques, however, it will be possible to produce a distorted pattern, such as that seen in FIG. 8 which can be based on biaxially orientable film and stretched appropriately to fit the moulding (when simulating) or the mould (when etching the mould) to compensate for the curvatures and yield a regular, well oriented texture pattern.

The result of the foregoing is a textured prototype 90. A mould of the textured prototype 90 is then produced, for example by casting the textured prototype 90 in a suitable mould forming material, such as silicone rubber. In this way, copies of the textured prototype can be made. A preferred material for these copies is polyurethane, although the invention is not limited in this regard.

Figure 10:
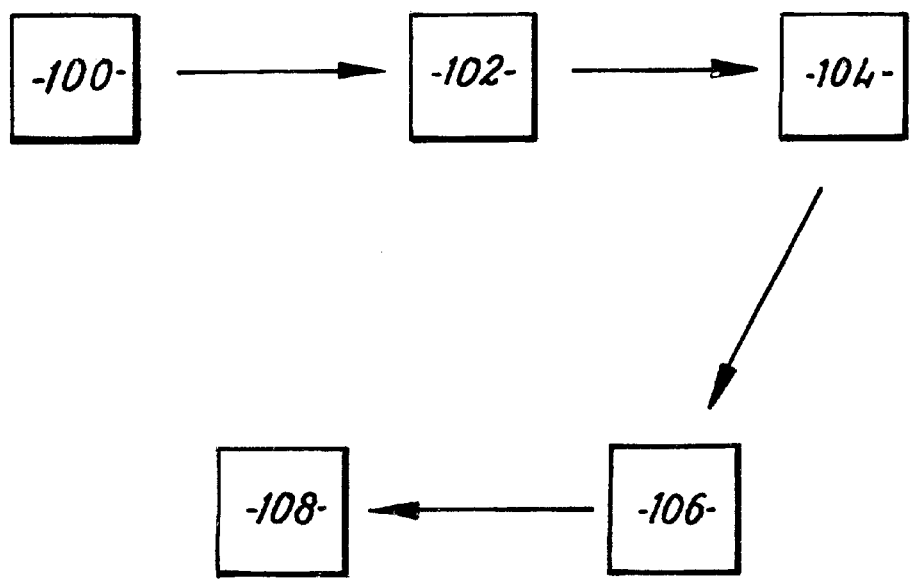
FIG. 10 is a schematic diagram showing steps in the production of copies of a textured prototype

FIG. 10 shows, in schematic fashion, process steps in another embodiment on the present invention. A prototype is produced using stereolithography stage 100. Next, a textured prototype is produced in a texturing step 102 such as those described herein. The textured prototype then undergoes a replication step 104 in which the textured prototype is cast in a mould-forming material, such as silicone rubber, and the cast is used to produce a former using a suitable former material, such as polyurethane. The former is a replica of the textured prototype. Next, a slush moulding step 106 is performed to produce a mould tool. In slush moulding, a metal shell is electroformed onto a former, which is this instance is the polyurethane former. The electroforming process produces a thin covering of nickel on the former, and thus this thin nickel coating holds the details of the texture of the original textured prototype, but in reverse. A mould tool suitable for injection moulding is produced by adding bolstering materials to the back of the nickel shell. Such a mould tool can be used in a moulding step 108 to produce tens of thousands of soft feel mouldings.

Another method for producing multiple moulded components involves producing a former in the manner described with reference to FIG. 10, and then producing hard or soft mould tools from the former by spray metal, ceramic, plaster or ceramic slip moulding techniques. The spray metal process involves spraying a metal plasma onto the surface of the former. The metal hardens on contact with the surface, and is deposited in layers to produce a very stable substrate which retains the details of the texture. The sprayed metal shell is then reinforced with resin to produce a moulding tool cavity. The core side of the tool is made by further processing of the mould so that a resultant metal tool can be quickly and cheaply produced for injection moulding. Nonlimiting examples of suitable metals include nickel, copper and aluminum. It is also possible to apply the above described mould tool production methods to the textured prototype itself, rather than to a former produced from the textured prototype.

An important application of the present invention is in the automobile industry. Texture is an important aspect of numerous automobile components, such as interior trim parts. Often, for aesthetic purposes, it is important that the texture of adjacent articles is in perfect register. The production of rapid prototypes and the ability to produce accurate copies thereof is thus of great importance.

Another application area of great importance is rapid tooling, in particular low volume tooling and moulding. The present invention provides a flexible, cost effective, and convenient way in which a concept design can be rapidly implemented to provide differently textured tools.

We claim:

1. A method for simulating the appearance of an article having surface texture comprising the steps of:
    applying a textured skin layer to a prototype, the skin layer having a relief material attached thereto as a surface texture and a release backing;
    peeling off the release backing from the prototype to produce a textured prototype.

2. A method according to claim 1, in which the relief material is preferentially adhered to the prototype to enable peel off of the release backing.

3. A method according to claim 1, in which the skin layer is soluble and is dissolved after the relief material is adhered to the prototype.

4. A method according to claim 3, in which the skin layer is soluble in a paint which is applied after application to the prototype.

5. A method according to claim 1, in which the skin layer is burnished on to the prototype.

6. A method according to claim 1, in which the surface texture of the skin layer is a random pattern texture.

7. A method according to claim 6, in which the surface texture is a leather texture.

8. A method according to claim 6, in which the surface texture is a woodgrain texture.

9. A method according to claim 6, in which the textured skin is a glass engraving resist.

10. A method according to claims 1, in which the textured skin is produced in a process wherein:
    a design corresponding to the surface texture of the textured skin is produced on a CAD system; and
    said design is cut from a sheet material under computer control.

11. A method according to claim 10, in which the textured skin is produced by:
    cutting a design corresponding to the surface texture of the textured skin from a sheet material; and,
    transferring the cut design from a release backing of the sheet material to the skin layer.

12. A method according to claim 1, in which the skin layer is stretchable to fit without creasing on to the prototype and the surface texture is imparted to the skin in a distorted fashion to compensate for skin stretching to fit the prototype.

13. A method according to claim 1, in which the prototype is produced by stereolithography.

14. A method according to claim 1, in which the prototype is produced by laminated object manufacture or selective laser sintering.

15. A method for simulating the appearance of a moulded article having mould imparted texture comprising the steps of applying a textured skin having a surface texture to a moulding to produce a textured moulding, thereby to simulate the appearance of the moulded article having mould imparted texture.

16. A method according to claim 15, in which the skin comprises a skin layer with relief material attached thereto as a surface texture.

17. A method according to claim 16, in which the skin layer constitutes a release backing peeled off the moulding after application of the relief material thereto.

18. A method according to claim 17, in which the relief material is preferentially adhered to the moulding to enable peel off of the release backing.

19. A method according to claim 16, in which the skin layer is soluble and is dissolved after the relief material is adhered to the moulding.

20. A method according to claim 19, in which the skin layer is soluble in a paint which is applied after application to the moulding.

21. A method according to claim 15, in which the skin is burnished on to the moulding.

22. A method according to claim 15, in which the surface texture of the skin is a random pattern texture.

23. A method according to claim 22, in which the surface texture is a leather texture.

24. A method according to claim 22, in which the surface texture is a woodgrain texture.

25. A method according to claim 22, in which the textured skin is a glass engraving resist.

26. A method according to claim 16, in which the textured skin is produced by:
   cutting a design corresponding to the surface texture of the textured skin from a sheet material; and
   transferring the cut design from a release backing of the sheet material to the skin layer.

27. A method according to claim 26, in which the cutting of the sheet material is computer controlled.

28. A method according to claim 27, in which the design corresponding to the surface texture is produced on a CAD system.

29. A method according to claim 15, in which the skin is stretchable to fit without creasing on to the moulding and the texture is imparted to the skin in distorted fashion to compensate for skin stretching to fit the moulding.

30. A method of producing copies of a textured prototype comprising the steps of:
   applying a textured skin layer to a prototype, the skin layer having a relief material attached thereto as a surface texture and a release backing;
   peeling off the release backing from the prototype to produce a textured prototype;
   producing a mould of the textured prototype; and,
   producing copies from the mould.

31. A method according to claim 30, in which the relief material is preferentially adhered to the prototype to enable peel off of the release backing.

32. A method according to claim 30, in which the skin layer is soluble and is dissolved after the relief material is adhered to the prototype.

33. A method according to claim 32, in which the skin layer is soluble in a paint which is applied after application to the prototype.

34. A method according to claim 30, in which the skin is burnished on to the prototype.

35. A method according to claim 30, in which the surface texture is a random pattern.

36. A method according to claim 35, in which the surface texture is a leather texture.

37. A method according to claim 35, in which the surface texture is a woodgrain texture.

38. A method according to claim 35, in which the textured skin is a glass engraving resist.

39. A method according to claim 30, in which the textured skin is produced in a process wherein:
   a design corresponding to the surface texture of the textured skin is produced on a CAD system; and,
   said design is cut from a sheet material under computer control.

40. A method according to claim 39, in which the textured skin is produced by:
   cutting a design corresponding to the surface texture of the textured skin from a sheet material; and
   transferring the cut design from a release backing of the sheet material to the skin layer.

41. A method according to claim 30, in which the skin is stretchable to fit without creasing on to the prototype and the surface texture is imparted to the skin in distorted fashion to compensate for skin stretching to fit the prototype.

42. A method according to claim 30, in which the step of producing a mould of the textured prototype comprises casting the textured prototype in a mould forming material.

43. A method according to claim 42, in which the mould forming material is silicone rubber.

44. A method according to claim 30, which the step of producing a mould of the textured prototype comprises a slush moulding process in which a metal coating is electro-formed onto the textured prototype or a replica thereof.

45. A method according to claim 44, in which the metal is nickel.

46. A method according to claim 30, in which the step of producing a mould of the textured prototype comprises a moulding process in which metal is sprayed onto the textured prototype or a replica thereof to form a metal shell.

47. A method according to claim 30, in which the prototype is produced by stereolithography.

48. A method according to claim 30, in which the prototype is produced by laminated object manufacture or selective laser sintering.

49. A method for producing copies of a textured moulding comprising the steps of:
   applying a textured skin layer to a moulding, the skin layer having a relief material attached thereto as a surface texture and a release backing;
   peeling off the release backing from the moulding to produce a textured moulding; and,
   producing copies from the mould.

50. A method according to claim 49, in which the relief material is preferentially adhered to the moulding to enable peel off of the release backing.

51. A method according to claim 49, in which the skin layer is soluble and is dissolved after the relief material is adhered to the moulding.

52. A method according to claim 51, in which the skin layer is soluble in a paint which is applied after application of the skin layer to the moulding.

53. A method according to claim 49, in which the skin is burnished on to the moulding.

54. A method according to claim 49, in which the surface texture os a random pattern texture.

55. A method according to claim 54, in which the surface texture is a leather texture.

56. A method according to claim 54, in which the surface texture is a woodgrain texture.

57. A method according to claim 49, in which the textured skin is a glass engraving resist.

58. A method according to claim 49, in which the textured skin is produced by:
   cutting a design corresponding to the surface texture of the textured skin from a sheet material; and,
   transferring the cut design from a release backing of the sheet material to the skin layer.

59. A method according to claim 58, in which the design corresponding to the surface texture is produced on a CAD system.

60. A method according to claim 49, in which the skin is stretchable to fit without creasing on to the prototype and the texture is imparted to the skin in distorted fashion to compensate for skin stretching to fit the moulding.

61. A method for simulating the appearance of an article having a surface textured skin comprising the steps of:
   producing a design corresponding to the textured skin on a CAD system;
   cutting the design from a sheet material under computer control; and,
   applying the textured skin to a prototype to produce a textured prototype.

62. A method according to claim 61, in which the textured skin comprises a skin layer with relief material attached thereto as a surface texture.

63. A method according to claim 62, in which the skin layer constitutes a release backing peeled off the prototype after application of the relief material thereto.

64. A method according to claim 63, in which the relief material is preferentially adhered to the prototype to enable peel off of the release backing.

65. A method according to claim 62, in which the skin layer is soluble and is dissolved after the relief material is adhered to the prototype.

66. A method according to claim 65, in which the skin layer is soluble in a paint which is applied after application to the prototype.

67. A method according to claim 62, in which the skin layer is burnished on to the prototype.

68. A method according to claim 62, in which the surface texture of the skin layer is a random pattern texture.

69. A method according to claim 62, in which the surface texture is a leather texture.

70. A method according to claim 62, in which the surface texture is a woodgrain texture.

71. A method according to claim 61, in which the textured skin is produced by:
   cutting a design corresponding to the surface texture of the textured skin from a sheet material; and,
   transferring the cut design from a release backing of the sheet material to the skin layer.

72. A method according to claim 62, in which the skin layer is stretchable to fit without creasing on to the prototype and the surface texture is imparted to the skin in distorted fashion to compensate for skin stretching to fit the prototype.

73. A method according to claim 61, in which the prototype is produced by stereolithography.

74. A method according to claim 61, in which the prototype is produced by laminated object manufacture or selective laser sintering.

75. A method for producing copies of a textured prototype comprising the steps of:
   producing a design corresponding to the surface texture of the textured skin on a CAD system;
   cutting the design from a sheet material under computer control;
   applying the textured skin design to a prototype to produce a textured prototype;
   producing a mould of the textured prototype; and,
   using the mould to produce copies of the textured prototype.

76. A method according to claim 75, in which the textured skin comprises a skin layer with relief material attached thereto as a surface texture.

77. A method according to claim 76, in which the skin layer constitutes a release back peeled off the prototype after application of the relief material thereto.

78. A method according to claim 76, in which the relief material preferentially adhered to the prototype to enable peel off of the release backing.

79. A method according to claim 76, in which the skin layer is soluble and is dissolved after the relief material is adhered to the prototype.

80. A method according to claim 79, in which the skin layer is soluble in a paint which is applied after application to the prototype.

81. A method according to claim 76, in which the skin layer is burnished on to the prototype.

82. A method according to claim 75, in which the surface texture is a random pattern texture.

83. A method according to claim 75, in which the surface texture is a leather texture.

84. A method according to claim 75, in which the surface texture is a woodgrain texture.

85. A method according to claim 75, in which the textured skin is produced by:
   cutting a design corresponding to the surface texture of the textured skin from a sheet material; and,
   transferring the cut design from a release backing of the sheet material to the skin layer.

86. A method according to claim 76, in which the skin is stretchable to fit without creasing on to the prototype and the surface texture is imparted to the skin in distorted fashion to compensate for skin stretching to fit the prototype.

87. A method according to claim 75, in which the step of producing a mould of the textured prototype comprises casting the textured prototype in a mould forming material.

88. A method according to claim 87 in which the mould forming material is silicone rubber.

89. A method according to claim 75, in which the step of producing a mould of the textured prototype comprises a slush moulding process in which a metal coating is electroformed onto the textured prototype or a replica thereof.

90. A method according to claim 89, in which the metal is nickel.

91. A method according to claim 75 in which the step of producing a mould of the textured prototype comprises a moulding process in which metal is sprayed onto the textured prototype or a replica thereof to form a metal shell.

92. A method according to claim 75, in which the prototype is produced by stereolithography.

93. A method according to claim 75, in which the prototype is produced by laminated object manufacture or selective laser sintering.

94. A method for producing copies of a textured moulding comprising the steps of:

producing a design corresponding to surface texture of a textured skin layer on a CAD system;

cutting the design from a sheet material;

applying a textured skin layer to a moulding, the skin layer further including a release backing;

peeling off the release backing from the moulding to produce a textured moulding; and, producing copies from the mould.

* * * * *